Figures 1, 2:
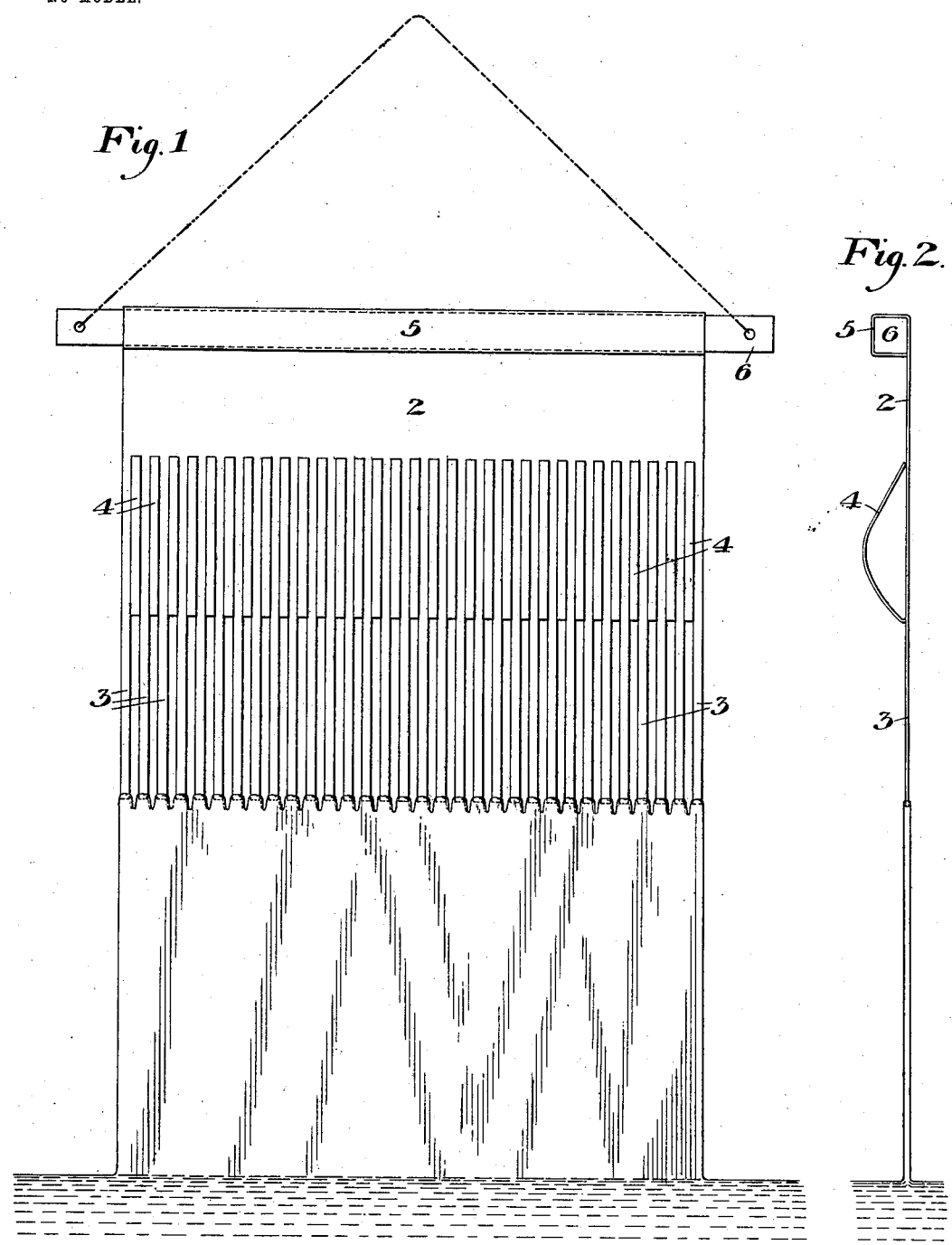

No. 758,544. PATENTED APR. 26, 1904.
J. H. LUBBERS.
BAIT FOR DRAWING GLASS.
APPLICATION FILED MAR. 16, 1903.
NO MODEL.

WITNESSES

INVENTOR

No. 758,544. Patented April 26, 1904.

UNITED STATES PATENT OFFICE.

JOHN H. LUBBERS, OF ALLEGHENY, PENNSYLVANIA, ASSIGNOR TO JAMES A. CHAMBERS, TRUSTEE, OF PITTSBURG, PENNSYLVANIA.

BAIT FOR DRAWING GLASS.

SPECIFICATION forming part of Letters Patent No. 758,544, dated April 26, 1904.

Application filed March 16, 1903. Serial No. 147,975. (No model.)

*To all whom it may concern:*

Be it known that I, JOHN H. LUBBERS, of Allegheny, in the county of Allegheny and State of Pennsylvania, have invented a new and useful Bait for Drawing Glass, of which the following is a full, clear, and exact description, reference being had to the accompanying drawings, forming part of this specification, in which—

Figure 1 is a front elevation showing my improved bait in the operation of drawing a sheet of glass from a molten bath, and Fig. 2 is an end elevation of the same.

My invention relates to the drawing of glass from a bath, and is designed to provide an improved bait for this purpose which will prevent cracking and breaking of the glass article being drawn and which may be cheaply made and is long-lived.

In the drawings, in which I show the bait arranged for drawing a glass sheet or plate, the bait consists of a metal plate or sheet 2, the lower portion of which is provided with a downwardly-extending series of separated strips or prongs 3. These prongs are preferably formed by slotting the sheet upwardly into a series of strips and then bending the alternate strips 4 upwardly, as shown in Figs. 1 and 2.

The bait may be connected to the lifting device or carrier in any suitable manner, and I have shown its upper portion 5 as folded or wrapped around an iron bar 6, by which the bait is connected to the vertically-movable lifting device.

In using the bait it is lowered into the bath until the depending prongs or strips 3 enter the bath a sufficient distance to enable the glass to be securely attached thereto, and the bait is then lifted in the usual manner, drawing the sheet or other glass article upwardly out of the bath. After the set of prongs 3 are worn out or burned off they may be cut away and the other set of prongs bent down into depending position, the bait being then again ready for further use.

The advantages of my invention result from the use of the plate having depending prongs, giving a simple and cheap construction of bait, which may be readily made. The bait is long-lived both by reason of the depending strips and the use of the two sets of strips. The strips being separated, they will not cause the cracking or breaking of the article under the expansion and contraction during the operation.

The material of the bait may be varied. It may be made in the form of a cylinder or other shape in cross-section, according to the article desired, and other changes may be made without departing from my invention.

I claim—

1. A bait for drawing glass, consisting of a metal sheet having a series of prongs or strips depending from its lower end; substantially as described.

2. A bait for drawing glass, consisting of a metal sheet having integral separated prongs or strips depending from its lower end; substantially as described.

3. A glass-bait, consisting of a metal sheet having its lower portion slotted into strips, part of said strips being bent upwardly into inoperative position; substantially as described.

In testimony whereof I have hereunto set my hand.

JOHN H. LUBBERS.

Witnesses:
JOHN MILLER,
H. M. CORWIN.